Jan. 2, 1951     L. C. SHEPPARD     2,536,230
STRING BEAN PREPARING UTENSIL
Filed May 21, 1946
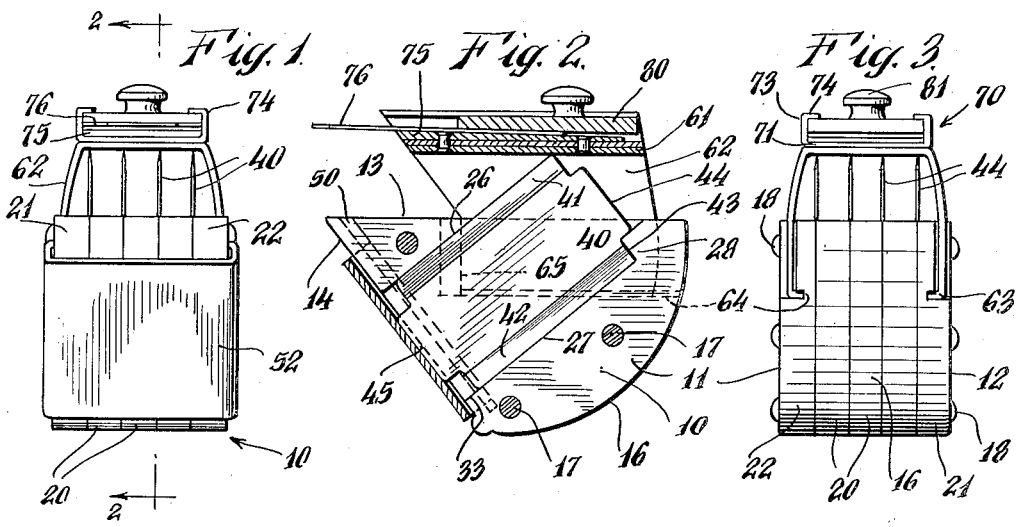
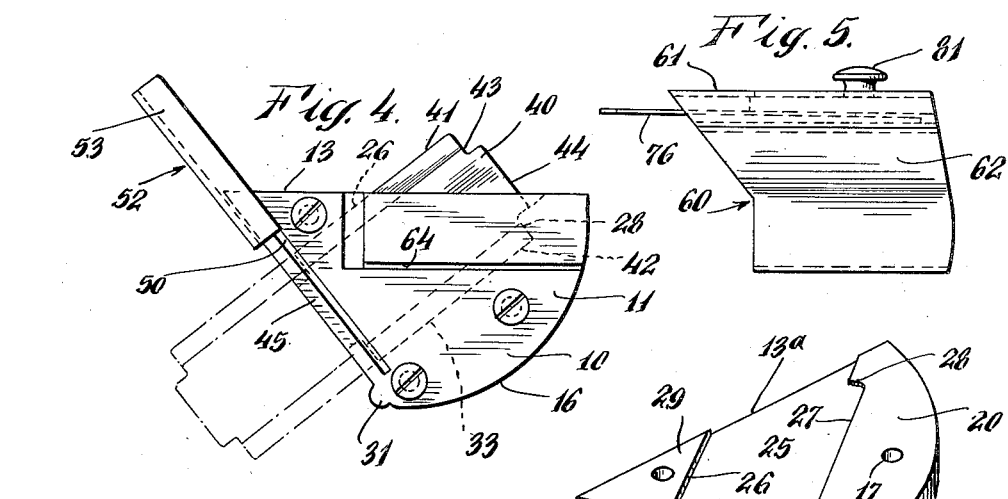
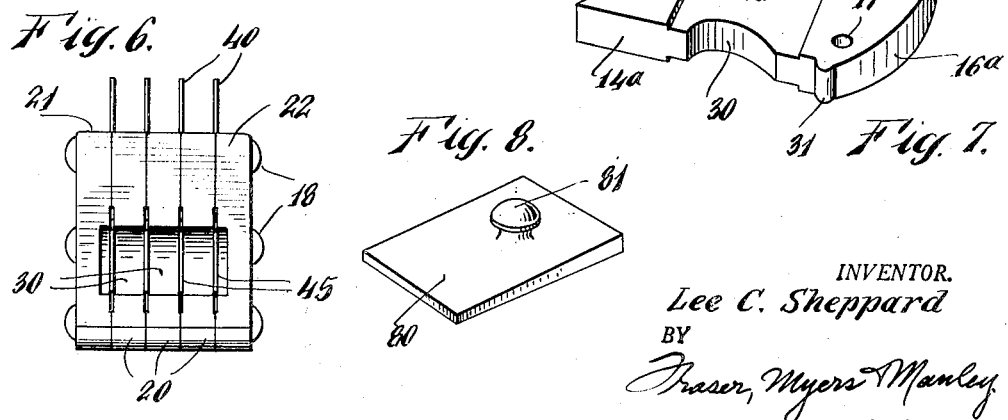
INVENTOR.
Lee C. Sheppard
BY
Fraser, Myers & Manley
ATTORNEYS.

Patented Jan. 2, 1951

2,536,230

UNITED STATES PATENT OFFICE 2,536,230

STRING BEAN PREPARING UTENSIL

Lee C. Sheppard, Brooklyn, N. Y.

Application May 21, 1946, Serial No. 671,137

4 Claims. (Cl. 146—171)

The present invention relates to a utensil for slicing string beans and the like in preparing them for cooking. More particularly it relates to a utensil for slicing string beans wherein the beans are pulled or pushed through a gang of knives for slicing them, and the utensil preferably also includes an auxiliary knife for topping the beans.

It is a matter of common knowledge that little, if any, secondary utility has been found for used safety razor blades around a household, and that they usually accumulate quite rapidly before being discarded. One of the features of the present invention is that it provides a secondary use for such used safety razor blades.

It is an object of the present invention to provide an improved utensil for slicing string beans and the like, which is of simple construction, inexpensive to manufacture, and wherein the cutting elements or blades may be cheaply and easily replaced by the user.

Another object of the invention is to provide a utensil for slicing string beans and the like wherein the effective cutting edges of the blades are shielded to protect the user from accidental injury, and wherein the blades may be easily and safely removed and replaced without requiring the user to finger the cutting edges.

According to the present invention I attain the foregoing and other objects by providing a utensil for slicing string beans and the like, comprising a body member having a substantially flat surface, and a plurality of spaced-apart safety razor blades—preferably of the "Gillette" double edged type—mounted therein and serving as the cutting elements, the blades being disposed in planes substantially perpendicular to said flat surface, and preferably being removably mounted in substantially parallel, open-ended slots in the body member, with one set of cutting edges projecting above said surface. A second member is also provided which has a surface thereof spaced from and substantially parallel to the first surface and engaging the projecting ends of the blades. The two surfaces serve to guide the string beans and the like which are fed therebetween past the cutting blades, and said surfaces may be considered as guiding surfaces for said beans. The second member preferably also serves as a shield for the exposed cutting edges of the blades to protect the user from accidental injury. The blade-receiving slots in the body preferably extend therethrough and are closed at their opposite ends by a movable closure plate which normally serves to retain the blades in the slots in proper working position—the slots preferably being constructed to permit endwise withdrawal of the blades from the body to avoid the necessity of the user fingering the cutting edges during such withdrawal. It is also preferred that the cutting edges of the blades be disposed at an angle of approximately 30° to one of said guiding surfaces, in order to assure efficient cutting action.

For a more detailed description of the invention, reference is now made to the accompanying drawings showing a preferred embodiment, wherein:

Figure 1 is a front elevational view of the slicing utensil of the present invention as viewed from the left in Fig. 2.

Fig. 2 is a longitudinal sectional view taken on the lines 2—2 in Fig. 1 and viewed in the direction of the arrows.

Fig. 3 is a rear elevation viewed from the right in Fig. 2.

Fig. 4 is a side elevation of the body member showing in phantom a safety razor blade partly withdrawn therefrom.

Fig. 5 is a side elevation of the cover member showing a bean "topping" blade in extended or working position.

Fig. 6 is a view similar to Fig. 1 with the top cover member and the slot closure plate removed.

Fig. 7 is a perspective view of one of the laminations which make up the body portion; and Fig. 8 is a perspective view of a wedging clamp for securing the topping blade in selected positions.

In the form of the invention illustrated, a body member 10 is provided of substantially wedge-shape in side elevation having side faces 11, 12, a substantially flat top surface 13, an inclined substantially flat front face 14, and an arcuate rear and bottom face 16. The body 10 is of a size and shape to be firmly and comfortably gripped in one hand.

As best seen in Figs. 3 and 7, the body 10 is composed of a plurality of laminations having several holes 17 extending therethrough and accommodating bolts 18 for maintaining the laminations in assembled relation. The body is composed of two side sections 21, 22, and a plurality of intermediate sections 20 of the type illustrated in perspective in Fig. 7. As shown in this figure, the side faces of the intermediate laminations 20 have been cut away or relieved to provide flat grooves 25 therein having parallel lateral shoulders 26, 27, and a short end shoulder or stop 28. The shoulders 26, 27 are arranged substantially perpendicularly to the front edge 14a, and the shoulder 26 makes an acute angle 29 with the top edge 13a. The front edge 14a has been recessed at 30 and a projection 31 has been formed on the lower end of the front edge 14a adjacent the arcuate portion 16a.

The inner face of side section 21 conforms substantially to the upper side face of the lamination section shown in Fig. 7, and the inner face of side section 22 conforms substantially to the bottom side face in the same figure. When the side sections and intermediate sections are assembled the flat grooves 25 complement each other and provide a plurality of substantially parallel elongated slots 33 which extend through the body 10 and are open at each end. The slots 33 are also disposed in planes substantially perpendicular to the plane of the top surface 13, with the lateral edge 26 disposed at an acute angle to said surface 13. As explained later, this acute angle preferably is approximately 30°. The slots 33 also are disposed in planes substantially perpendicular to the front face 14, with the edges 26, 27, of the slots preferably disposed at right angles to the front face.

As best seen in Fig. 2, the slots 33 are of a size and shape to snugly accommodate a plurality of safety razor blades 40 which are mounted therein. These blades preferably are of the "Gillette" double edged type having lateral cutting edges 41, 42, and notches 43 provided at the four corners. The end edges 44, 45 of the blades are unsharpened. The edge 42 of each blade engages the shoulder 27 of the slot 33 and is completely shielded thereby. The lower portion of lateral edge 41 of each blade engages the shoulder 26 of the slot 33, while the upper portion of this edge is exposed and projects above and beyond the top surface 13. As best seen in Fig. 2, one of the corner notches 43 of each blade engages the short shoulder or stop 28 at the upper end of each slot, which serves to position the blades within the slots and to limit the extent to which they project above the top surface.

On each side face 11, 12, there is provided a groove 50 which is parallel to the front face 14. A closure plate 52 having resilient side flanges 53 is provided with inwardly directed edges adapted to seat in the grooves 50 and to be slid therealong, to provide a removable closure 52 for the open ends of the slots 33. In closed position, as shown in Figs. 1 and 2, the inner face of the closure plate 52 ingages the end edge 45 of each blade and holds them firmly within the slots 33. The friction between the resilient side flanges 53 and the grooves is sufficient to maintain the plate 52 in closed position, and the projection 31 serves as a stop to limit its closing movement.

As illustrated in Fig. 4, the plate 52 may be slid along the grooves 50 to the open position shown to uncover the end edges 45 of the blades and to permit their ready removal from the body 10 for either reversal or replacement. Fig. 4 shows, in phantom, one of the blades partly removed from the body 10. As best illustrated in Fig. 6, the recesses 30 in the front face 14 align to form a larger recess exposing the lower end edges of the blades, whereby they may be gripped between the thumb and forefinger and easily withdrawn. The end edges of the blades are not sharpened and hence the user is not exposed to accidental injury in removing the blades as he or she does not have to finger the cutting edges.

To assist in the removal of the blades it is possible to apply finger pressure against the upper end edge 44 of each blade, but this ordinarily is not necessary. It will be apparent that as only one-fourth of the available cutting edges of a double edged razor blade is availed of, it is possible to reverse the blade positions four times as the cutting edges become dulled with repeated use, before it is necessary to replace the blades. Also, as before stated, it is not necessary to use new safety razor blades, as it has been found that used razor blades are very satisfactory for slicing string beans and the like with the utensil of the present invention.

A second member or cover 60, best seen in Fig. 5, is also provided. Essentially the cover 60 is of inverted U-shape having a web portion 61, resilient side walls 62 and inturned flanges 63. The flanges 63 seat in grooves 64 provided in the lateral faces of the body 10, which extend inwardly from the arcuate rear face 16 to permit the cover member 60 to be readily removed by being slid along the groove 64 to the right in Fig. 2. A vertical shoulder 65 on the body 10 limits the forward movement of the cover member 60.

It will be noted from Figs. 2 and 5 that the web 61 and the side walls 62 overhang the shoulder 65 so as to provide a more complete shield for the exposed cutting edges of the blades. In the preferred form of the invention the distance between the inner face of the web 61 and the top surface 13 should be less than the thickness of a person's finger, so as to render it practically impossible for the user's finger to come into contact with the exposed cutting blades. It will also be noted that the projecting ends of the blades engage against the inner face of the web 61 which preferably is a flat surface spaced from and substantially parallel to the flat top surface 13. The two surfaces 13 and 61 constitute guiding surfaces for string beans and the like which are fed therebetween past the cutting edges 41 of the blades. The exposed cutting edges of the blades also make an acute angle with the web surface, and as before stated, this angle preferably is approximately 30°. It has been found that the most efficient cutting action is obtained if the cutting edges of the blades are disposed at an acute angle to one of said guiding surfaces, and an agle of approximately 30° has been found to be the optimum.

A second U-shaped channel member 70 is secured to the upper surface of the web 61 by rivets—the second channel having a web 71, side walls 73 and inturned flanges 74. A wedge-shaped bottom plate 75 is also riveted to the base of the channel 70, with the thicker end of the wedge located to the left in Fig. 2. An auxiliary razor blade 76 is loosely mounted in the channel 70 and is slidable therealong to a working or extended position as shown in Fig. 2, or to a non-working position wherein the blade is completely housed within the channel 70. A wedging clamp 80 shown in Fig. 8, having a knob 81 on its upper surface also is slidably mounted in the channel 70 for clamping the blade 76 against the bottom 75. The clamp 80 tapers in a reverse direction from the bottom wedge member 75, and engages under the inturned flanges 74. The blade 76 may be slid along the channel 70 to the extended position shown in Fig. 2 and clamped in such position by sliding the wedge 80 to the left in the same figure.

The auxiliary razor blade 76 constitutes a

"topping" blade for use in removing the ends from the string beans in advance of slicing the beans.

In utilizing the slicing utensil of the present invention in the preparation of string beans and the like for cooking, it has been found preferable first to remove the ends from a quantity of beans with the topping blade 76 in the projecting position shown in Fig. 2. Then, the blade 76 is restored to its non-projecting position within the channel 70 and the beans are pushed or pulled through the gang of slicing blades from left to right in Fig. 2 between the top surface 13 on the body member 10 and the inner face of web 61. With the cutting edges of the blades preferably disposed at an angle of 30° to the plane of the web surface 61, it has been found that an efficient slicing action is assured, and the beans actually ride up the cutting edges and bear against and are guided by surface 61 (which serves as a reacting or guiding surface) as they are pushed or pulled through the gang of blades.

It will be apparent also, that with the cover member 60 in place, the fingers of the user are protected from accidental injury, as the cutting edges of the blades are well shielded. It is also possible to remove the blades individually from the body 10 for replacement or reversal merely by moving the closure plate 52 to uncover the slots 33 and withdrawing each blade endwise from the body by gripping the unsharpened end 45 of the blade and by applying assisting pressure to the upper end edge 44, if necessary.

In the preferred form of the invention illustrated, the blades 40 are only removable from the ends of the slots in the front face 14—the shoulders 28 at the upper ends of the slots preventing withdrawal of the blades from the top surface ends. It is possible, however, to eliminate the shoulders 28 and have the cover member 60 serve to retain the blades within the slots. Then when the cover 60 is removed by being slid along the grooves 64, the blades can be pulled out of the slots at the top surface ends.

While I have shown and described the preferred embodiment of my invention it will be apparent that changes may be made therein, without departing from the spirit of the invention or from the scope of the appended claims.

What I claim is:

1. A device for slicing string beans and the like comprising a member having a substantially flat surface, a plurality of spaced-apart flat cutting blades removably mounted within said member and disposed in planes substantially perpendicular to said surface, said blades having cutting edges projecting beyond said surface, and a second member having a surface spaced from and substantially parallel to said first-mentioned surface engaging the projecting ends of said blades and covering the projecting cutting edges thereof and providing a protective guard for said cutting edges, at least one of said surfaces constituting a guiding surface over which string beans are adapted to pass and to be fed past said cutting blades.

2. A device for slicing string beans and the like comprising a member having a substantially flat surface, a plurality of spaced-apart flat blades removably mounted within said member and disposed in planes substantially perpendicular to said surface, said blades having at least part of their cutting edges projecting beyond said surface, and a cover for said projecting blades flanking their side faces and having a surface portion spaced from and substantially parallel to said first-mentioned surface engaging the projecting ends of said blades and overhanging their projecting cutting edges and providing a protective guard for said cutting edges, said substantially parallel surfaces constituting guiding surfaces between which string beans are adapted to pass and to be fed past said cutting blades.

3. A device for slicing string beans and the like comprising a member having a substantially flat surface, a plurality of slots in said member communicating with said surface and disposed in planes substantially perpendicular thereto, a plurality of double-edged safety razor blades removably mounted in said slots, each said blade having at least part of one cutting edge projecting above said surface and another cutting edge within said slot, and a second member having a surface thereof spaced from and substantially parallel to said first-mentioned surface and engaging the projecting ends of said blades and overlying the projecting cutting edge portions thereof and providing a protective guard for said cutting edges.

4. A device for slicing string beans and the like, comprising a wedge-shaped body member having the top and front surfaces thereof forming a V in longitudinal cross-section and having a plurality of substantially parallel-walled, longitudinal slots therein communicating with said surfaces, the major surfaces of said slots lying in planes perpendicular to the top surface of the body member and the side walls of said slots being substantially perpendicular to said front surface of the body member, a plurality of double-edged safety razor blades removably mounted within said slots and having at least part of their cutting edges projecting above and beyond said top surface of the body member, a U-shaped cover member mounted on said body having a web portion spaced from and substantially parallel to the said top surface and engaging the free ends of said projecting blades, and a movable closure member engaging said front surface of the body member and slidable therealong, said closure member in one position overlying said slots and retaining said blades therein, and in another position uncovering said slots to permit endwise removal of the blades therefrom.

LEE C. SHEPPARD.

REFERENCES CITED

The following references are of record in the file of this patent:

UNITED STATES PATENTS

| Number | Name | Date |
| --- | --- | --- |
| 1,176,257 | Velcansky | Mar. 21, 1916 |
| 1,390,565 | Knowles | Sept. 13, 1921 |
| 1,619,746 | Miller | Mar. 1, 1927 |
| 1,827,977 | Erl | Oct. 20, 1931 |
| 2,082,524 | Sell | June 1, 1937 |
| 2,323,863 | Feemster | July 6, 1943 |
| 2,418,581 | Evernden | Apr. 8, 1947 |